United States Patent [19]
Hurkot

[11] Patent Number: 5,499,477
[45] Date of Patent: Mar. 19, 1996

[54] CARBON BLACK REFRACTORY SYSTEM

[75] Inventor: Donald Hurkot, Medicine Hat, Canada

[73] Assignee: Cancarb Limited, Alberta, Canada

[21] Appl. No.: 175,579

[22] Filed: Dec. 30, 1993

[51] Int. Cl.$^6$ ............................ F28D 17/04; F28D 17/02
[52] U.S. Cl. ................... 52/604; 52/660; 52/608; 110/338; 432/180; 165/9.1
[58] Field of Search ................ 52/660, 662, 664, 52/608, 604; 110/336, 338, 339; 432/180, 181, 182; 165/9.1, 9.2, 9.3

[56] References Cited

U.S. PATENT DOCUMENTS

| | | | |
|---|---|---|---|
| 111,691 | 2/1871 | Siemens et al. | 52/604 |
| 346,782 | 8/1886 | Smith | 52/604 |
| 1,881,325 | 10/1932 | Miller . | |
| 1,980,827 | 11/1934 | Reed . | |
| 1,987,644 | 1/1935 | Spear et al. . | |
| 2,172,714 | 9/1939 | Schack et al. | 52/604 X |
| 2,493,458 | 1/1950 | Koenig | 52/604 X |
| 2,823,027 | 2/1958 | Coberly | 52/604 X |
| 3,614,446 | 10/1971 | Leuthold et al. | 52/608 X |
| 4,519,442 | 5/1985 | Barna et al. | 165/9.2 |
| 4,761,930 | 8/1988 | Tepera | 52/664 X |
| 4,884,920 | 12/1989 | Perazzi | 52/608 X |
| 5,123,221 | 6/1992 | Legault | 52/608 X |
| 5,177,925 | 1/1993 | Winkler et al. | 52/608 X |
| 5,299,629 | 4/1994 | Hyde | 165/9.1 |

FOREIGN PATENT DOCUMENTS

| | | | |
|---|---|---|---|
| 909405 | 2/1945 | France | 52/604 |
| 1199336 | 12/1959 | France . | |
| 1115876 | 10/1961 | Germany . | |
| 771936 | 4/1957 | United Kingdom . | |
| 916582 | 1/1963 | United Kingdom . | |

*Primary Examiner*—Wynn E. Wood
*Attorney, Agent, or Firm*—Fitzpatrick, Cella, Harper & Scinto

[57] ABSTRACT

A refractory system for a reactor for producing carbon black. The system comprises a plurality of refractory bricks having an elongate axis arranged to provide at least one path through which a gas can flow. The path extends substantially perpendicular to the elongate axis and a plurality of the refractory bricks present a cross-sectional aspect to the gas flow which decreases, in the downstream direction, from a maximum aspect to reduce dead regions in gas flow adjacent the refractory bricks.

19 Claims, 7 Drawing Sheets

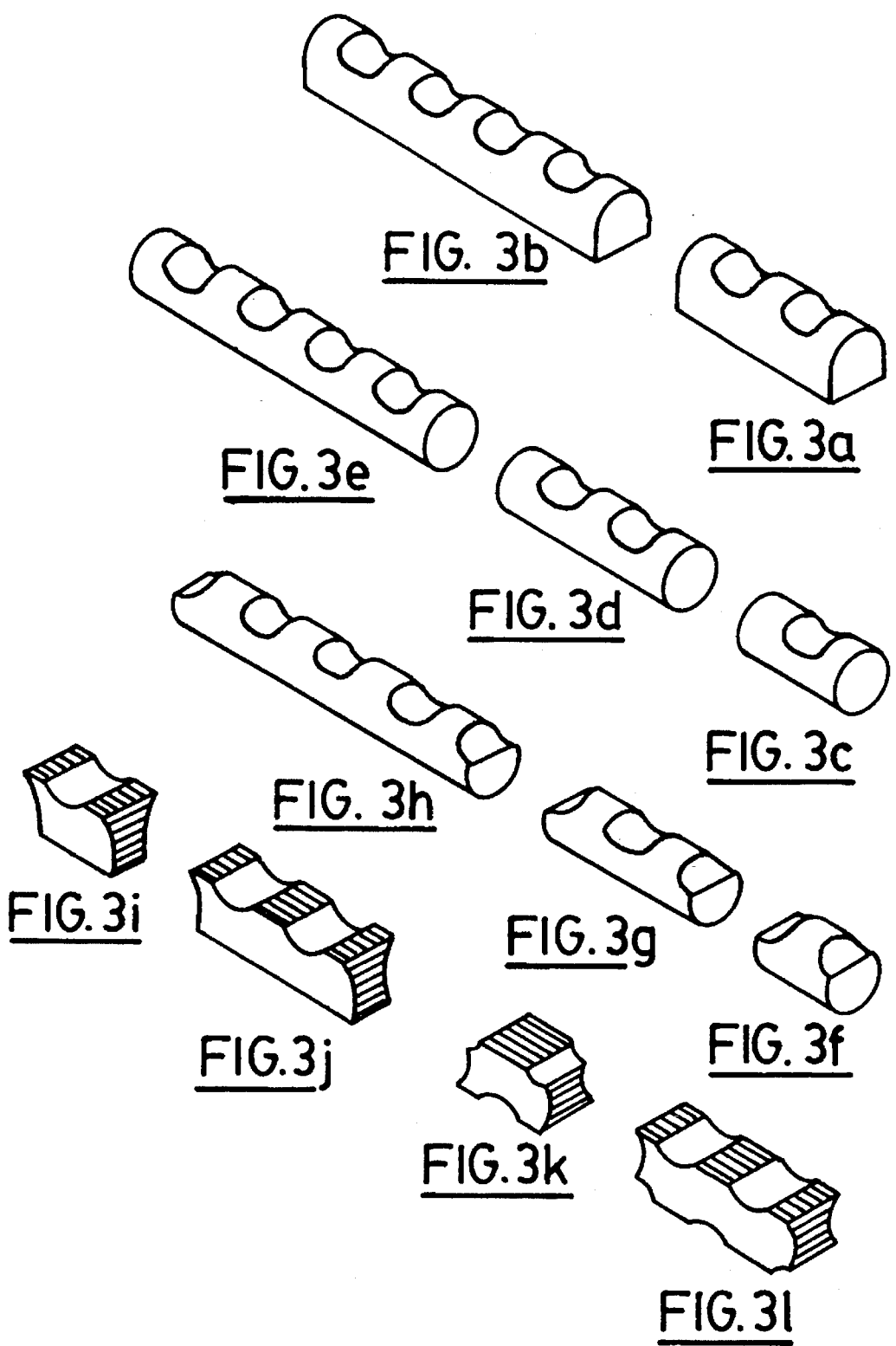

CARBON BLACK REFRACTORY SYSTEM

BACKGROUND OF THE INVENTION

1. Field of the Invention

The present invention relates to a refractory system for use in reactors for producing carbon black.

2. Description of the Prior Art

It is known to produce carbon black in commercial quantities by cracking a hydrocarbon feedstock material, such as natural gas (containing a mixture of one or more of methane, ethane, propane and butane gases), refinery bottoms, etc. to obtain carbon black and hydrogen gas. When methane is employed, the reaction may be represented by the equation:

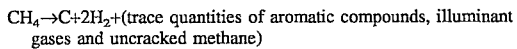

$$CH_4 \rightarrow C + 2H_2 + \text{(trace quantities of aromatic compounds, illuminant gases and uncracked methane)}$$

Known commercial processes for cracking methane to form carbon black, commonly referred to as 'thermal black', comprise the steps of heating a checkerwork of refractory bricks in a reactor to a temperature of about 2700° F. and then passing the feedstock methane through the checkerwork in an essentially oxygen free environment. During the reaction, the methane is cracked into a mixture of thermal black, hydrogen gas and trace amounts of undesired byproducts. To drive the endothermic cracking process, energy (heat) is removed from the refractory bricks during the cracking operation, thereby reducing the temperature of the bricks. When the temperature of the refractory bricks is lowered to about 1200° F., the reaction must be terminated to allow the refractory bricks to be reheated to the desired temperature.

Problems exist with the known processes in that some thermal black accumulates on the refractory brick and degrades the thermal transfer process, both during the heating of the bricks and during the cracking of the methane. It has been determined that this degradation reduces the efficiency of the thermal black production process, reducing the yield and increasing the cost of the final product. A further problem exists with known processes in that, at the operating temperatures within the thermal black reactor, the accumulated thermal black eventually reacts with the generally silica-based material of the refractory bricks causing erosion and/or breakdown of the bricks. This breakdown necessitates that the reactors be 're-bricked' sooner, and thus more often, than would otherwise be the case. Moreover, rebricking requires the reactor to be shut down for relatively long periods of time and incurring a significant cost for the labour and materials to effect the re-bricking. Further, as the refractory bricks erode and breakdown, the eroded refractory material tends to contaminate, and thus lower the quality of, the thermal black final product.

SUMMARY OF THE INVENTION

It is an object of the present invention to provide a novel refractory system for producing carbon black which obviates or mitigates at least one of the above-mentioned problems of the prior art.

It is a further object of the present invention to provide a novel process of producing carbon black.

According to one aspect of the present invention, there is provided a refractory system for a reactor for producing carbon black, the system comprising: a plurality of refractory bricks having an elongate axis arranged to provide at least one path through which a gas can flow, the at least one path extending substantially perpendicular to the elongate axes and the plurality of refractory bricks being shaped to reduce dead regions in the gas flow adjacent the refractory bricks.

According to another aspect of the present invention, there is provided a process of producing carbon black from a gaseous hydrocarbon feedstock comprising the steps of:

(i) introducing a gas flow comprising the feedstock to a refractory system comprising a plurality of refractory bricks;

(ii) arranging the refractory bricks to present a cross-sectional aspect to the gas flow, (iii) heating the refractory system to a predefined first operating temperature;

(iv) decreasing the aspect in the direction of the gas flow;

(v) producing a carbon aerosol comprising carbon black; and (vi) separating the carbon black from the carbon aerosol.

It will be apparant to those of skill in the art that the order of certain Steps in the present process is not particularly restricted. For example, Steps (iii) and (iv) may be reversed without departing from the scope of the present process.

In a preferred embodiment, the present process comprising the further step of: (vii) stopping the gas flow when the temperature of the refractory system drops to a predefined second operating temperature. In this embodiment, it is most preferred if Steps (iii) through (vii) are repeated in a cyclical fashion.

As used throughout this specification, the term "predefined first operating temperature" is meant to encompass the temperature to which the bricks in the refractory system are heated to effect production of a carbon aerosol comprising carbon black. Practically this translates to a temperature of at least about 2400° F., preferably a temperature in the range of from about 2400° to about 2950° F., more preferably in the range of from about 2500° to about 2900° F., most preferably in the range of from about 2600° to about 2800° F.

As used throughout this specification, the term "predefined second operating temperature" is meant to encompass the temperature to which the bricks in the refractory system are cooled sufficiently such that production of the carbon aerosol comprising carbon black is complete and the bricks must be reheated. Practically this translates to a temperature of less than about 1500° F., preferably a temperature in the range of from about 1000° to about 1500° F., more preferably in the range of from about 1000° to about 1400° F., most preferably in the range of from about 1100° to about 1300° F., In a preferred embodiment of the present process, after the carbon black is separated from the carbon aerosol (i.e. Step (vi)), the latter is recycled to the heating step (i.e. Step (iii)) to improve the overall efficiency of the process The term "carbon black", as used throughout this specification is meant to encompass artificially prepared carbon or charcoal. Non-limiting examples of carbon black include thermal black, furnace black, lamp black and the like. The present invention is particularly suited to a system for the production of thermal black.

Preferably, the refractory bricks are arranged in at least first and second courses, the elongate axes of the refractory bricks of each course being arranged perpendicular to the elongate axis of the refractory bricks of the course above or below. Also preferably, the refractory bricks in one course include means to engage the refractory bricks of the course above or below and the means to engage is preferably a groove, or half-groove, sized and shaped to engage the refractory bricks.

In a presently preferred aspect of the invention, the refractory bricks are circular in cross-section, although elliptical and tear-drop and other shaped embodiments are also contemplated.

BRIEF DESCRIPTION OF THE DRAWINGS

Embodiments of the present invention will be described, by way of example only, with reference to the accompanying drawings, in which:

FIGS. 3a through 3l illustrate component refractory bricks of one embodiment of the present invention;

DETAILED DESCRIPTION OF THE PREFERRED EMBODIMENTS

Figure 1:
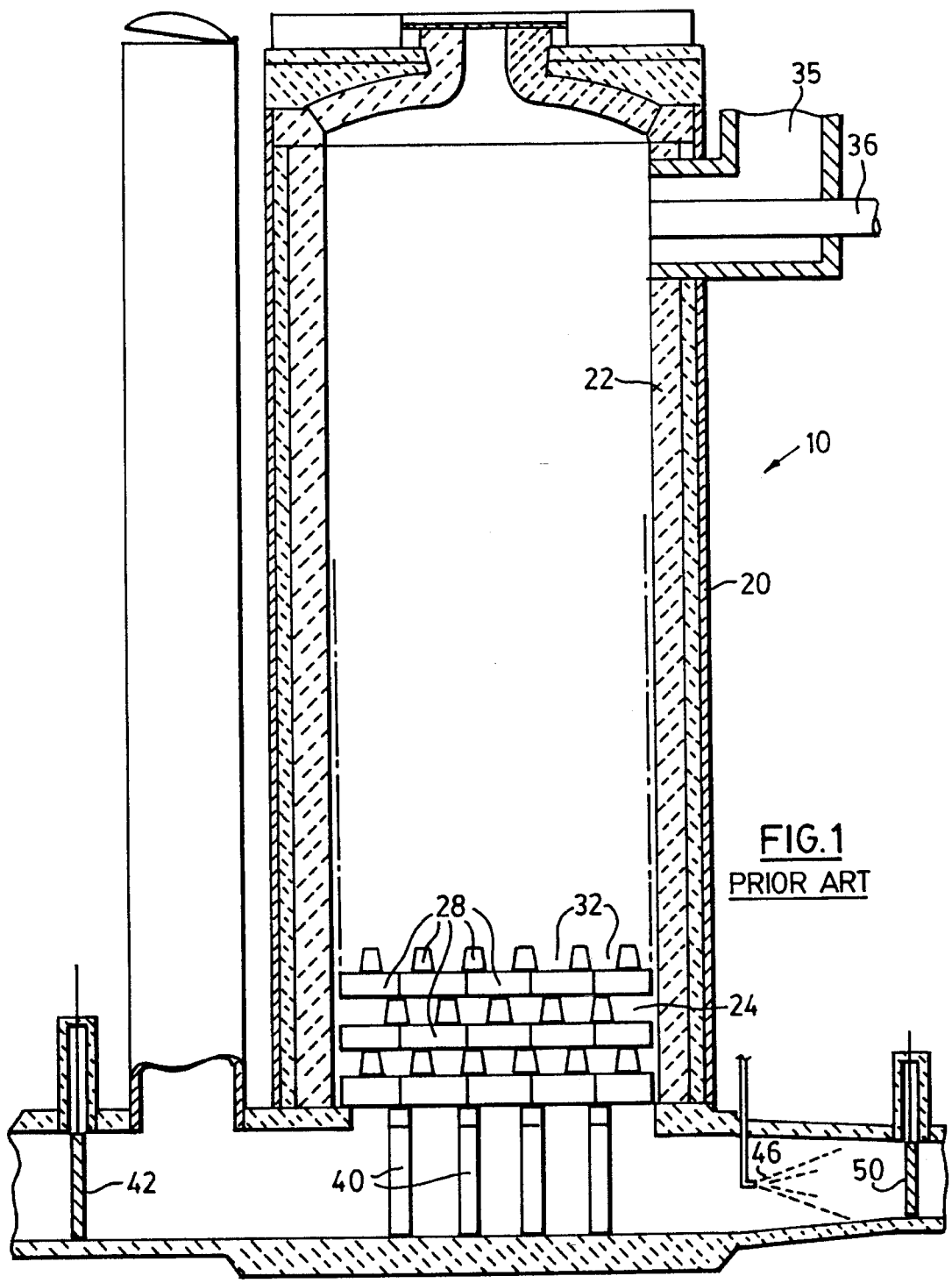
FIG. 1 illustrates a prior art carbon black reactor.

FIG. 1 illustrates a prior art thermal black reactor 10. Reactor 10 comprises a vertical cylindrical body 20 which is lined with a refractory material 22. The interior of reactor 10 surrounds a checkerwork 24 of wedge-shaped refractory bricks 28 which define a series of tortuous passages 32. Gases flow through passages 32 from a pair of ports 35, 36 at the top of reactor 10, to a series of exit ports 40 at the bottom of reactor 10.

Reactor 10 operates in two cycles, a heat cycle and a make cycle. In the heat cycle, combustion air enters reactor 10 through entry port 35 and a suitable fuel enters reactor 10 through entry port 36. The resulting fuel-air mixture is combusted to heat refractory bricks 28 to a desired temperature. Typically, thermal black reactors are operated in pairs with one reactor in a make cycle while the other is in its heat cycle. In such a case, the hydrogen gas produced by the make cycle reactor is used as the heating fuel in the heat cycle reactor and the cycles of the two reactors are alternated regularly. The waste products from the combustion of the fuel in the heat cycle exits through the ports 40 at the bottom of the reactor and may be directed to an incinerator (not shown) through a control gate 42.

Once refractory bricks 28 have reached the desired temperature (2700° F., for example), the supply of combustion air and fuel is terminated and methane feedstock enters reactor 10 through entry port 36. As the methane travels through passages 32 defined by the wedge-shaped refractory bricks, it is cracked into a 'carbon aerosol', which is a gaseous mixture of hydrogen and the thermal black. The mixture of carbon aerosol and trace quantities of aromatic compounds, illuminant gases and uncracked methane exits the bottom of the reactor through exit ports 40 and passes through one or more water sprays 46 which cool the mixture. The mixture is directed through a control gate 50 to a 'baghouse' (not shown) wherein the thermal black (and any other solids) are separated from the remainder of the gaseous components of the mixture.

Over the course of time, some thermal black accumulates on at least portions of the refractory bricks. As previously mentioned, this thermal black accumulation degrades the efficiency of the heat transfer to and from the refractory brick (essentially acting as an insulator). This degradation results in a reduced yield of thermal black as some thermal black remains in the reactor after completion of the make cycle and principally because the cracking reaction is not as efficient due to the reduced thermal transfer from the refractory brick to the hydrocarbon feedstock.

Further, as mentioned above, at the operating temperature of the reactor, the accumulated thermal black reacts with the silica-based refractory material to erode and degrade the bricks, and also results in contamination of the thermal black final product which is recovered in the baghouse.

It has been discovered that, by providing a novel refractory system with an improved reactant flow path for the hydrocarbon feedstock through the refractory system during the cracking, the accumulation of thermal black on the refractory bricks can be significantly reduced or, in certain cases, substantially eliminated. This reduction leads to an increase in yield of final product and, it is contemplated, will lead to an increased useful life for the refractory bricks and reduced contamination of the final thermal black product.

More specifically, it has been discovered that one of the principal reasons for the accumulation of thermal black is the formation of 'dead regions' in the gas flow adjacent portions of the refractory bricks. These dead regions comprise areas of reduced gas flow rate wherein thermal black may accumulate. Of course, dead regions also reduce the 'active' surface area of the refractory brick which contributes to the cracking process as little or no gas flow impinges on the portion of the brick covered by the dead region.

Figure 2:
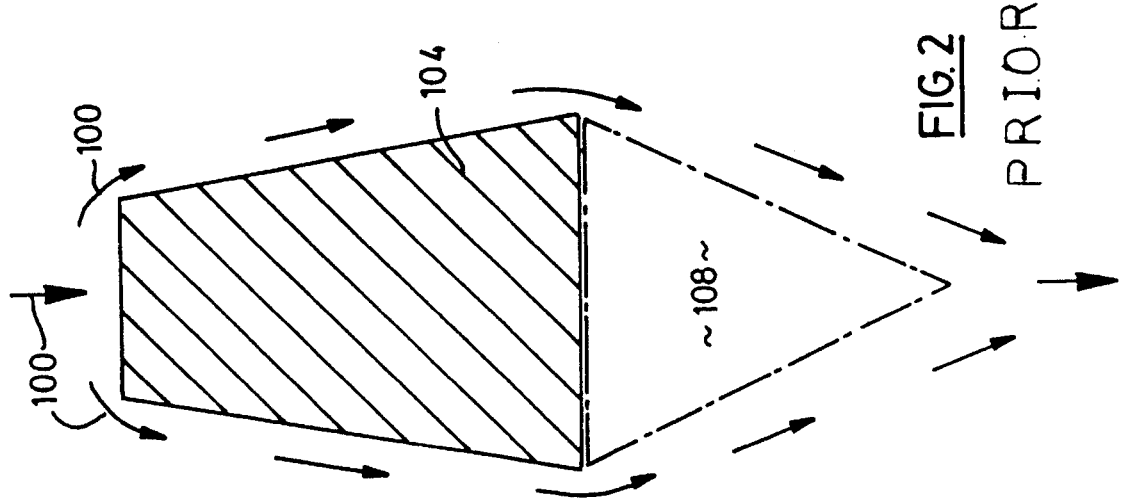
FIG. 2 illustrates a representation of a gas flow past a prior art wedge-shaped refractory brick.

In conventional refractory systems, wedge-shaped refractory bricks are employed and are stacked on their bases in spaced, alternating rows to define the path for the gas flow. It has been discovered that a significant dead region is formed in the gas flow adjacent the base of the wedge. FIG. 2 illustrates a pictorial representation of a gas flow 100 around a wedge-shaped brick 104 and a resulting dead region 108 which occurs in the gas flow adjacent the base of brick 104. Dead region 108 forms soon after the commencement of gas flow 100 and is relatively stable. That is, once formed, dead region 108 tends to remain, preventing gas flow adjacent the base of brick 104 and allowing thermal black produced during the make cycle to accumulate within the dead region.

FIGS. 3a through 3l illustrate embodiments of the refractory bricks employed in a refractory system in accordance with the present invention. The bricks of FIGS. 3c through 3h comprise the bricks forming the majority of the refractory system and comprise elongate, generally cylindrical refractory bodies with one or more grooves or half-grooves (where the groove occurs at an end of the brick) formed along the longitudinal surface thereof. The bricks of FIGS. 3a and 3b comprise elongate bodies with similar grooves, or half-grooves, formed on a radially curved surface opposite an elongate longitudinal flat surface. FIGS. 3i through 3l illustrate a series of end-bricks which are discussed in more detail hereinbelow. Each of these bricks is formed of an appropriate refractory material, as would be apparent to those of skill in the art.

Figure 4:
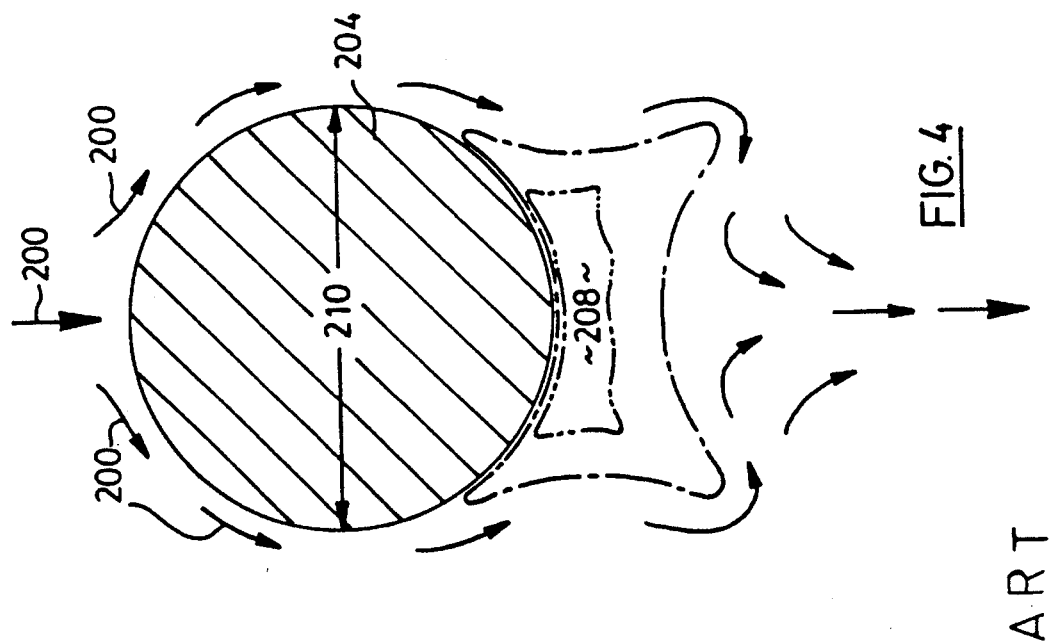
FIG. 4 illustrates a representation of a gas flow past a refractory brick according to the present invention.

FIG. 4 illustrates a pictorial representation of a gas flow 200 around a brick 204 of FIGS. 3c through 3h, and a resulting dead region 208. As shown in the Figure, the cross-section of brick 204 has been designed such that the cross-sectional aspect of brick 204 which is presented to gas flow 200 decreases in the downstream direction from its greatest point 210. As is apparent from the Figure, the decreasing aspect of brick 204 which is presented to gas flow 200 results in gas flow 200 remaining substantially adjacent the portion of brick 204 downstream of the maximum aspect point. This results in a dead region 208 downstream of brick 204 which is relatively small, in comparison to dead region 108.

Depending upon several factors, including characteristics of the gas, the gas flow rate, the size of the brick at point 210, and the rate at which the cross-section aspect decreases downstream of point 210, dead region 208 may move, alter size and/or collapse over time.

It is contemplated that as dead region 208 is smaller, or in some cases substantially eliminated, than is the case with prior art bricks 104, more of the surface area of brick 204 contributes to thermal transfer than is the case with the wedge-shaped brick 104. In other words, the percentage of the brick's surface which is 'active' in the cracking process is increased. Further, as dead region 208 is smaller, or substantially eliminated, the accumulation of thermal black on brick 204 is reduced, or substantially eliminated.

Figure 5A:
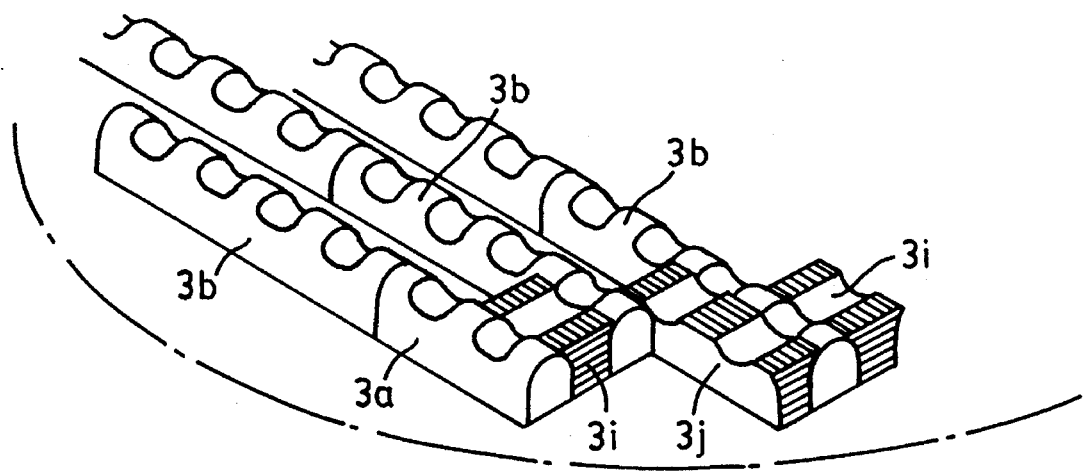
FIGS. 5a and 5b illustrates portions of courses of refractory bricks laid in a reactor in accordance with the present invention.

FIG. 5a illustrates a first course of the refractory system fabricated from the bricks shown in FIGS. 3a and 3b. As will be apparent to those of skill in the art, the majority of the course of bricks will be those shown in FIG. 3b but, to accommodate the curvature of the interior of the reactor, the shorter bricks of FIG. 3a may also be employed. To 'seal' the courses of the refractory system and prevent the combustion gases and the carbon aerosol mixture from contacting refractory material 22 lining the reactor chamber, end-bricks (FIGS. 3i through 3l) are placed as shown to seal the perimeter of each course.

Figure 5B:
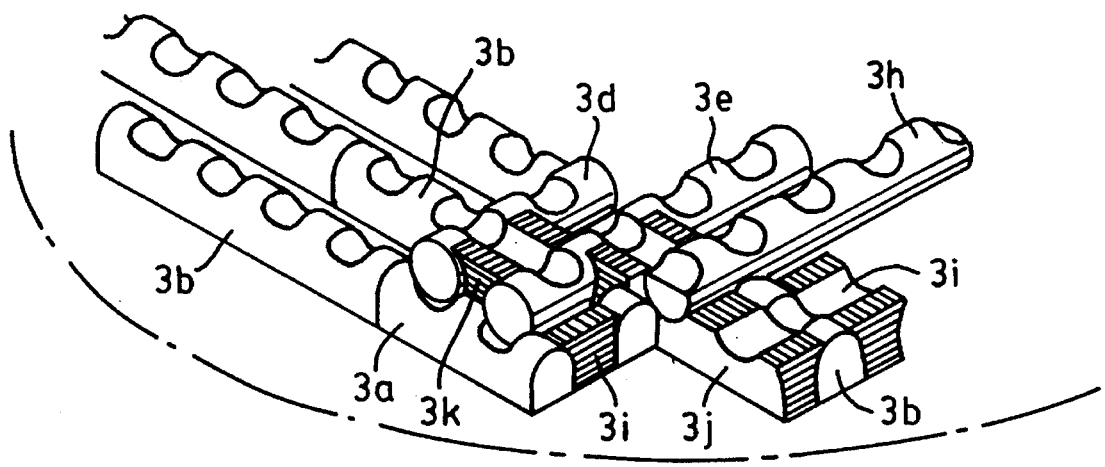

FIG. 5b illustrates a partial second course of the cylindrical bricks of FIGS. 3c through 3h being laid with the round underside of the cylindrical bricks mating with the grooves, and pairs of half-grooves, of the upper surfaces of the bricks of the first course which are laid perpendicular to the course above. Again, as would be apparent to those of skill in the art, where necessary an end-brick (one of those shown in FIGS. 3i through 3l as appropriate) would be included to seal the perimeter of the second course.

Each subsequent course of the refractory system would be laid, perpendicular to the course below, using the cylindrical bricks of FIGS. 3c through 3h wherein the round underside of the bricks of one course mate to the grooves and half-grooves of the course below. The top course is preferably principally formed with the bricks of FIGS. 3c through 3e, as appropriate, wherein the bricks are laid inverted such that the grooves and half grooves of the bricks in the top course engage the grooves and half grooves of the course below. Of course, the top course is also formed with the appropriate end bricks to provide the desired 'seal'.

Figure 7:
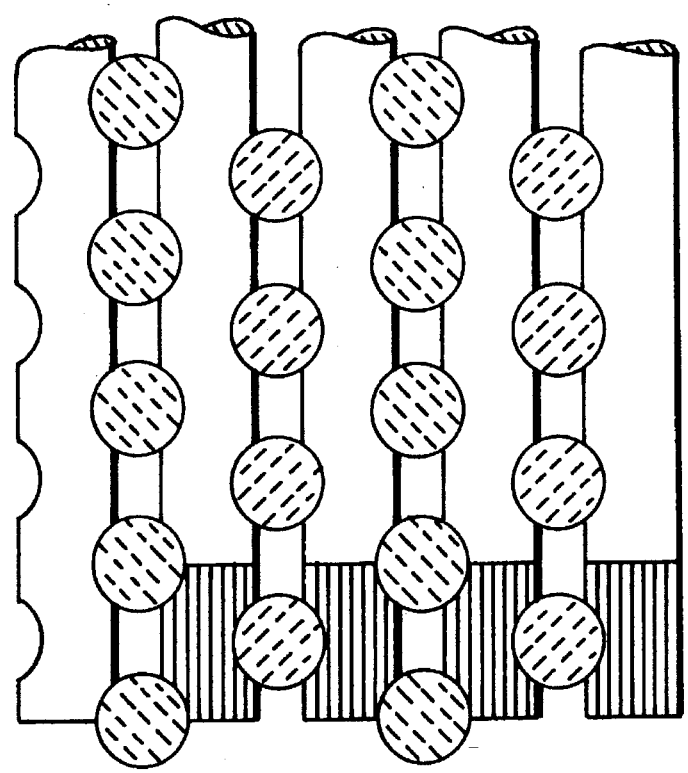
FIG. 7 illustrates a section of FIG. 6, taken along line 7—7.
Figure 6:
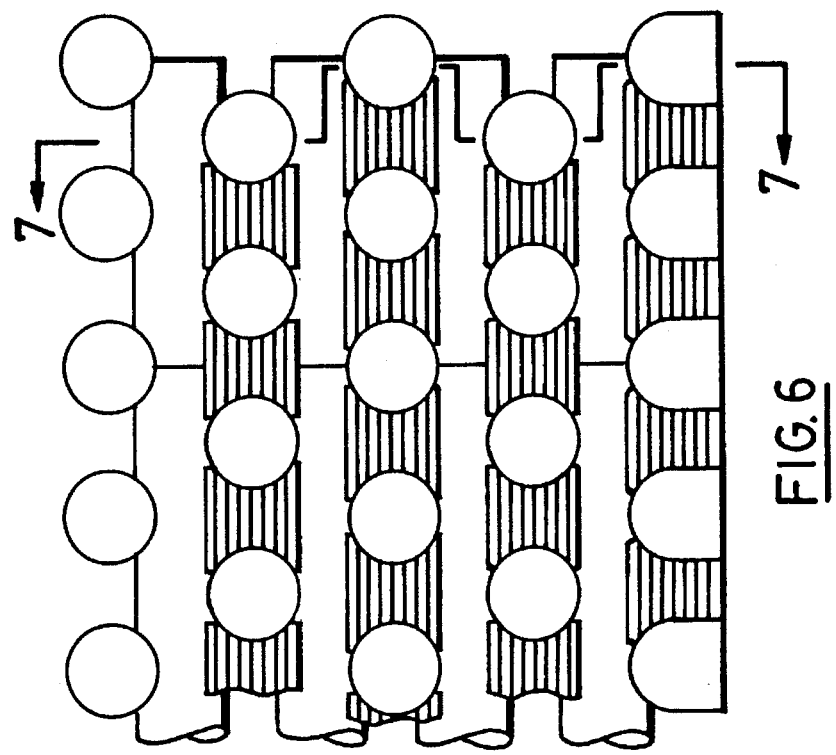
FIG. 6 illustrates a portion of a refractory system constructed in accordance with the present invention.
Figure 8:
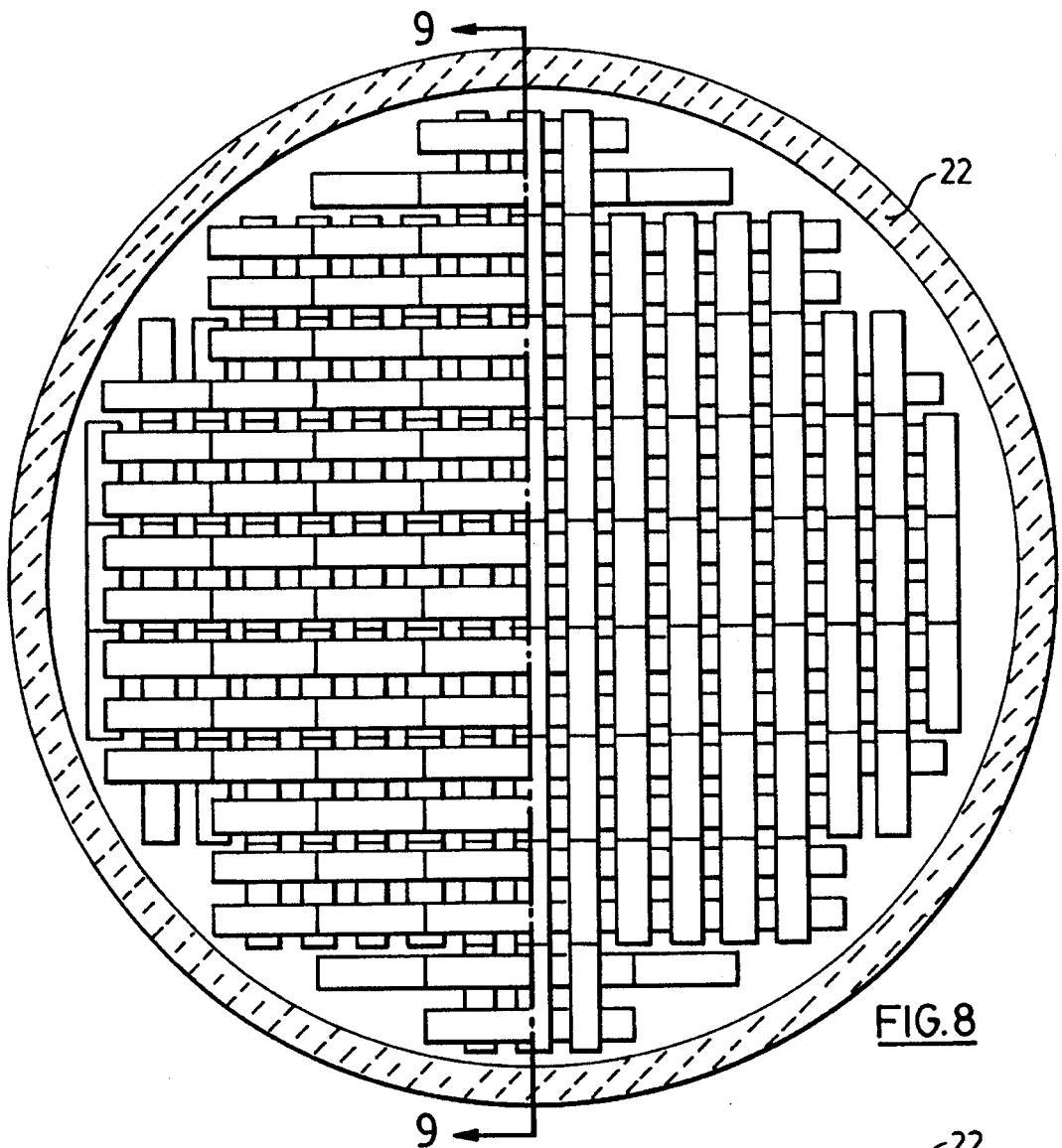
FIG. 8 illustrates a top view of a section of a refractory system constructed in accordance with the present invention in a reactor.
Figure 9:
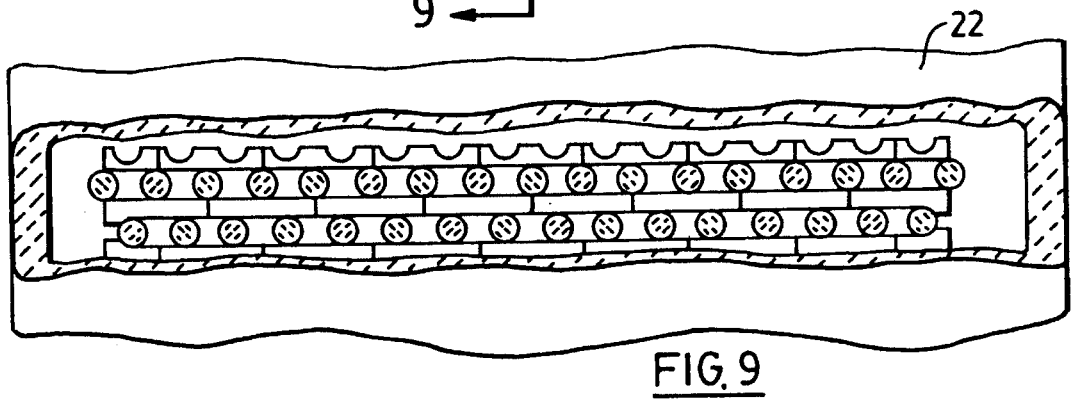
FIG. 9 illustrates a sectioned side view of the reactor of FIG. 8.

FIGS. 6 and 7 illustrate a portion of several courses of the refractory system with the end-bricks (hatched) in place. As apparent from FIGS. 6 and 7, there are no flue openings in the stack of courses i.e. one looking downward on the stack would not be able to see through the stack. FIG. 8 illustrates a top view of a cross section of the completed refractory system in a reactor, with the top course being shown to the right of line 9—9 and the course below being shown to the left of line 9—9. FIG. 9 illustrates a side cut-away view of the refractory system in the reactor of FIG. 8. As can clearly be seen in these Figures, the spaces between each of the parallel refractory bricks of each course, and the spaces between each course, define a tortuous path for the gas flow.

While the present invention provides a refractory system which reduces accumulated thermal black on the refractory bricks and increases the percentage of active surface of the refractory bricks, it is also contemplated that the invention provides an additional benefit in that a refractory system, including grooved bricks according to the present invention, may be relatively easily and simply constructed through the engagement of the grooves with the bricks of the course above or below, thus reducing the time and labour requirements for re-bricking a reactor.

Figure 10:
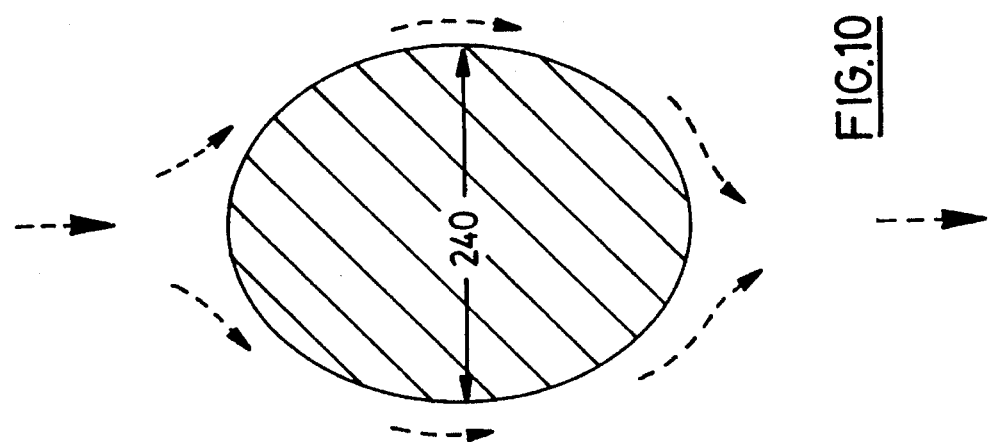
FIG. 10 illustrates a cross section through an elliptical refractory brick in accordance with the present invention.

As shown in FIG. 4, the preferred embodiment of the present invention includes a refractory brick with a circular cross section. It is contemplated however, that refractory bricks of other cross-sections may also be employed provided that the cross-section of the brick has been designed such that the cross-sectional aspect of the brick which is presented to the gas flow decreases, in the downstream direction, from a maximum aspect presented to the gas flow. As mentioned above, this decrease promotes the gas flow to remain substantially adjacent the brick downstream of the maximum aspect point. For example, FIG. 10 illustrates a cross-section of a refractory brick for use with the present invention wherein the brick has an elliptical cross-section with a maximum aspect indicated at 240, the aspect decreasing downstream relative to the gas flow.

Figure 11:
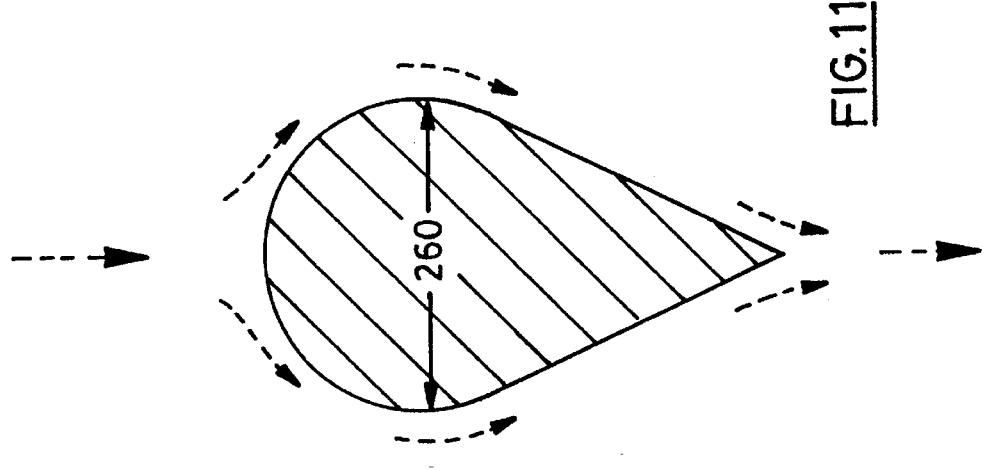
FIG. 11 illustrates a cross section through a tear-drop shaped refractory brick in accordance with the present invention.

FIG. 11 illustrates another refractory brick for use with the present invention wherein the brick has a 'tear-drop' shaped cross-section with a maximum aspect indicated at 260, the aspect decreasing in the downstream direction of the gas flow.

Figure 12:
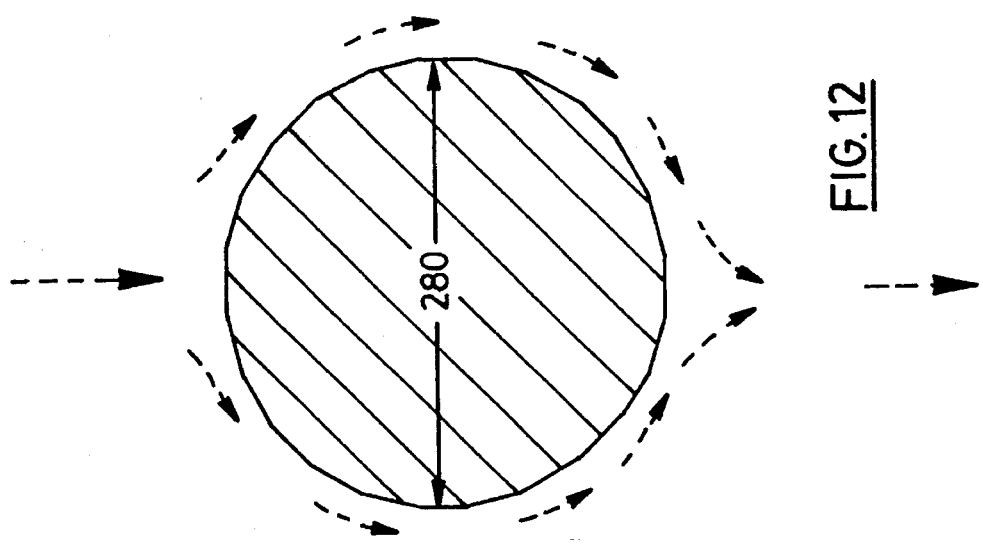
FIG. 12 illustrates a cross section through a multi-side shaped brick in accordance with the present invention.

While the previous exemplary cross-sectional shapes of the bricks have smoothly decreased their aspect from the maximum aspect point, the present invention is not limited to such shapes. FIG. 12 illustrates another contemplated refractory brick for use with the present invention wherein a brick with a polyhedron shaped cross-section is employed and again, the brick presents a maximum aspect at point 280, the aspect decreasing in the downstream direction, albeit not smoothly. In this particular example, a brick with a twenty-four sided cross-section is employed however, as will be apparent, the actual number of sides is not particularly limited provided that the number is selected such that the gas flow is maintained substantially adjacent the brick downstream of the maximum aspect point.

It will be apparent to those of skill in the art that the primary consideration in selecting the cross-section of refractory bricks for use with the present invention is that the cross-section should result in reduced dead regions in the gas flow travelling through the refractory system. Of course, it is also important that it be possible to construct a refractory system which is mechanically stable and relatively easily constructed.

For example, it may be the case that the tear-drop shaped brick of FIG. 11 is better suited to providing the desired flow characteristics than a brick of circular cross-section but it is contemplated that it may not be cost-effective to mechanically construct a large refractory system from bricks of this shape. Of course, if the improvement in yield and other economic operating characteristics merits it, the cost of constructing a refractory system employing elliptical or tear-drop shaped bricks may still be justified and it is not intended to exclude such embodiments from the scope of present invention.

What is claimed is:

1. A refractory system for a reactor for producing carbon black, comprising:

a plurality of refractory bricks each having an elongate axis, the plurality of bricks being arranged to provide at least one path through which a gas can flow, said at least one path extending substantially perpendicular to the elongate axes, and each of said plurality of refractory bricks having a cross-section for reducing the formation of dead regions in said gas flow adjacent said bricks, each brick cross-section having a width which decreases in a downstream direction with respect to the gas flow to reduce the dead regions, said plurality of refractory bricks being disposed in at least three courses such that bricks of a first course are staggered with respect to bricks of the third course, bricks of the second course being disposed at an angle with respect to bricks of the first course, the three courses presenting an aspect to said gas flow which is substantially free of flue openings.

2. The refractory system defined in claim 1, wherein the elongate axes of the refractory bricks of said first course are substantially perpendicular to the elongate axes of the refractory bricks of said second course.

3. The refractory system defined in claim 2, wherein each refractory brick in said first course of refractory bricks further includes means to engage one refractory brick of said at least second course of refractory bricks.

4. The refractory system defined in claim 3, wherein said means to engage comprises at least a portion of a groove operable to engage said at least one refractory brick of said second course of refractory bricks.

5. The refractory system defined in claim 4, further including refractory end-bricks operable to seal the perimeter of each of said first and second courses to substantially prevent gas flow therethrough.

6. The refractory system defined in claim 1 wherein said cross sectional aspect decreases smoothly from maximum width.

7. The refractory system defined in claim 6, wherein the cross section of each of said plurality of refractory bricks is circular.

8. The refractory system defined in claim 6, wherein the cross section of each of said plurality of refractory bricks is elliptical.

9. The refractory system defined in claim 6, wherein the cross section of said plurality of each of refractory bricks is tear-drop shaped.

10. The refractory system defined in claim 6, wherein the cross-section of each of said plurality of refractory bricks is in the shape of a polyhedron.

11. A refractory system for a reactor for producing carbon black, comprising:

a first course of refectory bricks disposed substantially parallel to each other and spaced apart to permit gas to flow through said first course in a direction orthogonal thereto;

a second course of refractory bricks disposed over said first course, said second course of refractory bricks being disposed substantially parallel to each other and spaced apart to permit the gas to flow through said second course in a direction orthogonal thereto; and a third course of refractory bricks disposed over said second course and being staggered with respect to the first course of refractory bricks, said third course of refractory bricks being disposed substantially parallel to each other and spaced apart to permit the gas to flow through said third course in a direction orthogonal thereto, the three courses of refractory bricks being disposed to present an aspect to the gas flow which is substantially free of flue openings, each brick of said first, second, and third courses having a cross-section with a width which decreases in a downstream direction with respect to the gas flow to reduce the formation of dead regions adjacent said each brick.

12. A system according to claim 11, further comprising refractory end bricks disposed at ends of said first and second courses for sealing the perimeter of each of said first and second courses to substantially prevent gas flow therethrough.

13. A system according to claim 11, wherein the first and second courses are disposed perpendicular with respect to each other, and wherein the first and third courses are disposed parallel to each other.

14. A system according to claim 11, wherein each brick of said first course includes a notch for engaging the bricks of the second course.

15. A system according to claim 11, wherein each brick has a substantially circular cross-section.

16. An array of refractory bricks for use in a reactor for producing carbon black, comprising:

a plurality of refractory bricks each having an elongate axis, the plurality of bricks being arranged to provide at least one path through which a gas can flow, said at least one path extending substantially perpendicular to the elongate axes, each of said plurality of refractory bricks having a cross-section with a width which decreases in a downstream direction with respect to the gas flow to reduce the formation of dead regions adjacent said bricks, said plurality of refractory bricks being disposed in at least three courses such that bricks of a first course are staggered with respect to bricks of the third course, bricks of the second course being disposed at an angle with respect to bricks of the first course, the three courses presenting an aspect to the gas flow which is substantially free of flue openings; and a plurality of end-bricks disposed at ends of said first and second courses to seal a perimeter of said array to substantially prevent gas flow through the ends of the first and second courses.

17. An array according to claim 14, wherein each brick of said first course includes means for engaging at least one brick of said second course.

18. An array according to claim 14, wherein each brick has a cross-section which is substantially circular.

19. An array according to claim 14, wherein each brick has a cross-section that is substantially oval.

* * * * *